United States Patent
Moll et al.

(10) Patent No.: US 7,319,702 B2
(45) Date of Patent: Jan. 15, 2008

(54) APPARATUS AND METHOD TO RECEIVE AND DECODE INCOMING DATA AND TO HANDLE REPEATED SIMULTANEOUS SMALL FRAGMENTS

(75) Inventors: Laurent R. Moll, Saratoga, CA (US); Manu Gulati, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 996 days.

(21) Appl. No.: 10/684,998

(22) Filed: Oct. 14, 2003

(65) Prior Publication Data

US 2004/0153586 A1 Aug. 5, 2004

Related U.S. Application Data

(63) Continuation-in-part of application No. 10/356,661, filed on Jan. 31, 2003.

(51) Int. Cl.
*H04L 12/56* (2006.01)

(52) U.S. Cl. .............. 370/476; 370/419; 370/535; 710/66; 711/201

(58) Field of Classification Search ........... 370/363, 370/419, 476, 463, 535; 714/4; 710/66, 710/65; 711/200, 201
See application file for complete search history.

(56) References Cited

U.S. PATENT DOCUMENTS 4,451,916 A * 5/1984 Casper et al. ............. 714/4

* cited by examiner

*Primary Examiner*—John Pezzlo
(74) *Attorney, Agent, or Firm*—Garlick Harrison & Markison

(57) ABSTRACT

A data aligner aligns a data segment having a granularity of less than a width of an internal data path. The data aligner aligns a fragment of data for alignment with a current segment or delay the fragment to combine with a next segment for alignment of data. A buffer receives the aligned data from the data aligner for interim storage and subsequent output onto an internal data path.

20 Claims, 7 Drawing Sheets

FIG. 9

| D/#C0..1 | D/#Cprev | MUXprev | D/#Cnext | IW is | POS enter | MUX | WEn0..1 |
|---|---|---|---|---|---|---|---|
| 11 | 0 | x | x | C-01-x | 0 | 0 | 11 |
| 11 | 1 | 0 | x | 1-01-x | + | 0 | 11 |
| 11 | 1 | 1 | 1 | 0-10-1 | + | 1 | 11 |
| 11 | 1 | 1 | 0 | 0-10-C | + | 1 | 10 |
| 10 | 0 | x | x | C-0C-x | 0 | 0 | 10 |
| 10 | 1 | 0 | x | 1-0C-x | + | 0 | 10 |
| 10 | 1 | 1 | x | 0-1C-x | x | 1 | 00 |
| 01 | x | x | 1 | x-C0-1 | 0 | 1 | 11 |
| 01 | x | x | 0 | x-C0-C | 0 | 1 | 10 |
| 00 | x | x | x | x-CC-x | x | x | 00 |

Columns grouping:
- STATE MACHINE INPUT: D/#C0..1, D/#Cprev, MUXprev, D/#Cnext
- DATA WORD STATE: IW is  (0=even double-byte, 1=odd double-byte, C=control)
- Position of the double-byte in the packet after a control: POS enter
- STATE MACHINE OUTPUT: MUX, WEn0..1

900

APPARATUS AND METHOD TO RECEIVE AND DECODE INCOMING DATA AND TO HANDLE REPEATED SIMULTANEOUS SMALL FRAGMENTS

CROSS REFERENCE TO RELATED APPLICATION

The present application is a continuation-in-part of and claims priority under 35 U.S.C. 120 to the following application, which is incorporated by reference herein:

U.S. Utility Application entitled PACKET DATA SERVICE OVER HYPERTRANSPORT LINK(S), having an application number of Ser. No. 10/356,661, and a filing date of Jan. 31, 2003.

BACKGROUND OF THE INVENTION

1. Technical Field

The embodiments of the invention relate to communication technology and, more particularly to receiving and managing data based on a particular communication protocol.

2. Description of Related Art

Electronic devices may employ various communication technologies to communicate. Communication links may be physical media and/or wireless links. Various communication links are known to interface at a chip level, board level, network level or at a much larger system level. Examples of communication links include buses within a digital processing device, such as a computer. Such examples include PCI (peripheral component interface) bus, ISA (industry standard architecture) bus, USB (universal serial bus), as well as other connecting media. Communication technologies are typically based on certain communicating protocols, such as SPI (system packet interface) and hypertransport (HT) based technologies. HT was also previously known as lightning data transport (LDT). The HT standard sets forth definitions for a high-speed, low-latency protocol that may interface with today's buses, such as AGP, PCI, SPI, 1394, USB2.0, and 1 Gbit Ethernet, as well as next generation buses including AGP8x, infiniband, PCI-X, PCI 3.0, and 10 Gbit Ethernet.

HT interconnects provide high-speed data links between coupled devices and most HT enabled devices include at least a pair of HT ports so that HT enabled devices may be daisy-chained. In an HT chain or fabric, a device may communicate with other coupled devices using appropriate addressing and control. Examples of devices that may be HT chained include packet data routers, server computers, data storage devices, and other computer peripheral devices. In today's networks and/or systems employing a communication link for data transfer, it is common to see HT and/or SPI (such as SPI-4) protocols being employed. The SPI-4 and HT communication standards may be utilized to transfer data between various components, devices and systems. Generally, SPI-4 and HT interconnects provide high speed data links to facilitate data transfer.

Although these communication protocols may allow for high speed data transfer, various devices receiving the data may not have the capability of processing the data at the same frequency as the data received. For example, data transfer rates of 1.6 G bits/sec may be reached utilizing HT and/or SPI-4 protocols. However, if the device receiving this data has an internal data path which runs at 400 MHz, then there is a 4-to-1 frequency scaling (may also be referred to as slow-down) relative to the input data speed. Without some mechanism to compensate and adjust for this difference in the frequencies of the input data link and the internal data path, the receiving device may not be able to adequately process the data flow.

One general technique to adequately process incoming data is to employ an internal data path that is wider than the byte-width of the incoming data stream. For example, a technique may employ an internal data path width which is the reverse ratio as the above noted ratio between the incoming data rate and the clock rate of the internal data path. Thus, for a frequency scaling of 4-to-1 between the incoming data rate and the clock frequency of the internal data path, the internal data path may be increased by a width of four to ensure that the internal data path may adequately handle the data received.

To transfer the incoming data onto an internal data path, a data receiving unit typically employs temporary storage, such as a buffer, so that the incoming data may be expanded to the width of the internal data path to retain a desired high bandwidth. When a buffer is employed to expand the data width, writes to memory of less than the width of the data path may require memories with multiple write ports. That is, in order to generate multiple writes of less than the width of the internal data path, a memory device may require more than one write port. One disadvantage of memory devices utilizing more than one write port is that the complexity of the device increases significantly. Furthermore, a specialized memory structure may be required, since many standard memory devices do not have more than one write port. The embodiments of the present invention described herewith address a situation in which a single write port and a single read port memory devices may be utilized to implement a buffer to handle the frequency scaling and data fragmentation between a high input data rate and a slower internal data path.

SUMMARY OF THE INVENTION

An apparatus and method to implement a data aligner to separate data from a received data stream into a segment of predefined number of bytes to identify data bytes for alignment. The data has a granularity of less than a width of an internal data path so the data aligner aligns a fragment of data for alignment with a current segment or delay the fragment to combine with a next segment. A buffer receives the aligned data from the data aligner for interim storage and subsequent output onto an internal data path.

In one embodiment the data aligner segments data into a segment of eight bytes to identify data bytes for alignment and in which the aligner aligns a double-byte fragment of data with a current segment or delay the fragment to combine with a next segment for alignment into the buffer for subsequent output onto the internal data path.

BRIEF DESCRIPTION OF THE SEVERAL VIEWS OF THE DRAWINGS

FIG. 9 shows a logic table for a state machine utilized in the circuit of FIG. 8.

DETAILED DESCRIPTION OF THE EMBODIMENTS OF THE INVENTION

Embodiments of the invention may be practiced in a variety of settings in which a component, device or system receives incoming data that generally follow a particular communication protocol. In the description below, SPI4 and HT communication standards are utilized as examples of protocols used to transfer data at a higher rate. However, it is to be noted that other standards and protocols may be readily implemented in practicing other embodiments of the invention. Furthermore, the embodiments described below implement a reassembly buffer in which the reassembly buffer operates as a temporary storage medium for the incoming data, as well as a mechanism to provide the catch-up function to transfer the incoming data onto an internal data path that typically operates at a lower frequency than the incoming data. However, it is to be noted that other storage media may be implemented in other embodiments to practice the invention. The invention need not be limited to the use of a reassembly buffer for receiving data based on the SPI-4 and/or HT standard.

Figure 1:
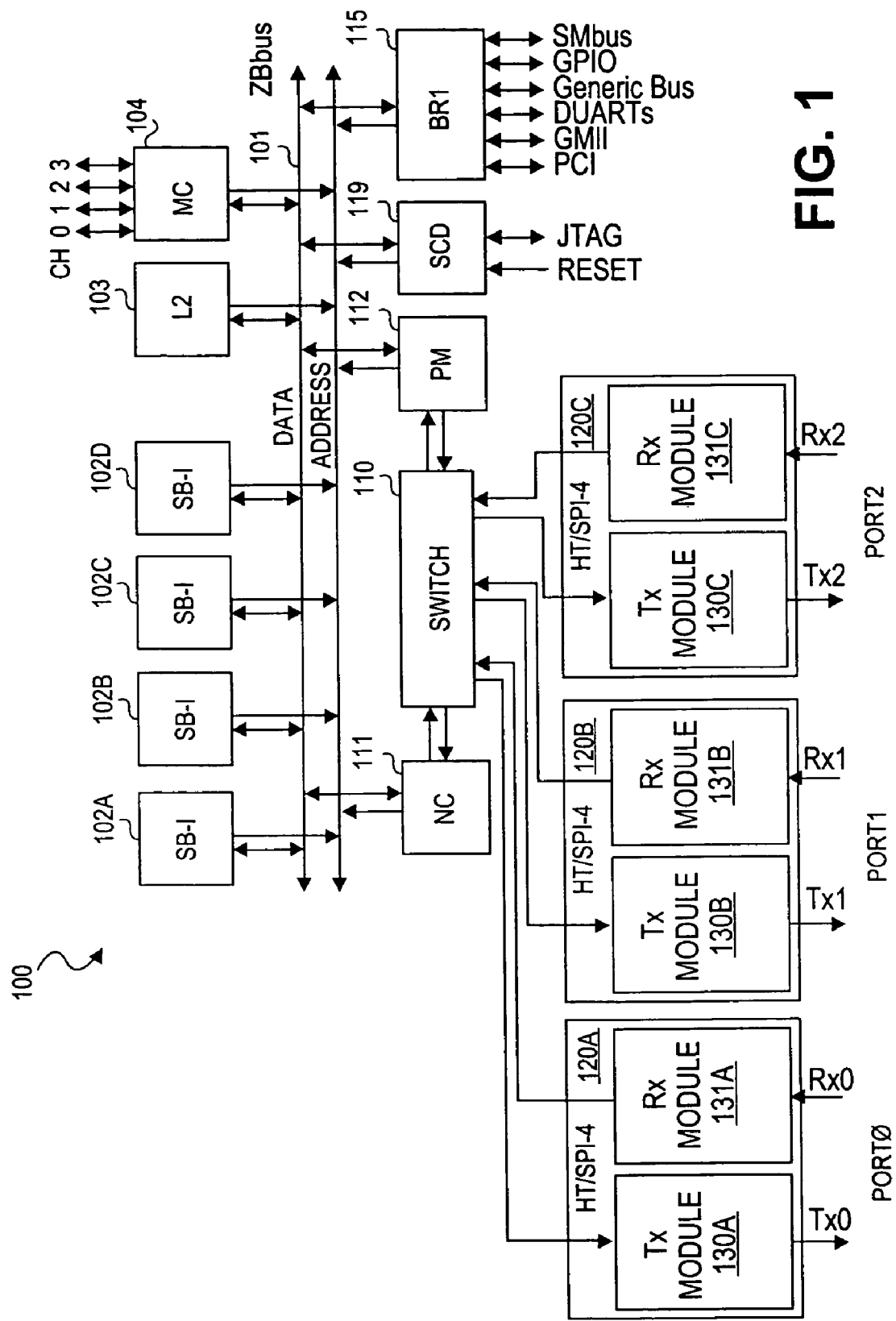
FIG. 1 is a block schematic diagram of an embodiment of an example system implementing multiple processors and various other devices for data processing.

Referring to FIG. 1, an example processing device 100 is illustrated in which a number of various units are operably coupled to one another through an internal bus 101. The internal bus 101 is also referred to as a ZBbus in the particular embodiment shown. Processor device 100 may be an integrated circuit (IC) or it may be embodied in separate integrated circuits. In the particular embodiment of FIG. 1, the units shown may be constructed within a single IC so that the IC provides a complete system-on-a-chip solution that includes one or more processors, memory controller, network, input/output (I/O) interface and data interface to provide a scalable, cache-coherent, distributed shared memory system. The example system 100 is shown having 4 separate processors 102. However, other embodiments of system 100 may operate with a single processor or any number of multiple processors. The example system 100 may operate in various applications including, packet processing, exception processing, switch control and management, higher layer of switching and filtering, application and computer servers, storage switches and systems, protocol conversion, and VPN (virtual private network) access, firewalls and gateways.

Other than the processors 102 (also noted as SB-1), system 100 includes a level 2 (L2) cache 103 to operate with the level 1 cache present in individual processors 102. The processors 102 and cache 103 are operably coupled to the ZBbus. System 100 also includes a memory controller 104, switch 110, node controller 111, a packet manager 112, a bridge unit 115 and a system controller and debug (SCD) unit 119.

In the example system 100, the processors 102 operate utilizing a particular instruction set architecture. Although the processors may be designed to operate utilizing the IA-32 or IA-64 instruction set architectures of Intel Corporation or the power PC instruction set, as well as others, the processors 102 in the particular example operate comprise four low-power, superscaler 64-bit MIPS compatible processors with separate instruction and data caches. The processors 102 are coupled to a high-performance, on-chip, cache-coherent internal bus 101 referred to as the ZBbus. In one embodiment, the high-performance ZBbus operates as a 128 Gbps bus. The ZBbus is a cache-line wide (256 bits), split-transaction, cache-coherent bus which interconnects the various other modules shown in FIG. 1. In the particular embodiment, the ZBbus operates at half the processor core clock frequency for a bandwidth of 128 Gbps at 500 megahertz. The bus has separate address, data, and control sections. The address and data sections are arbitrated separately to allow for a high bus utilization. The ZBbus supports a MESI protocol that helps maintain cache-coherency between the L1 caches, L2 cache and the I/O bridge, packet manager and node controller.

One or more of the SB-1 processors may be a quad issue, in order execution, processor that implements the MIPS 64 architecture. The SB-1 core includes hardware support for floating-point processing and branch prediction. SB-1 memory subsystem includes a 32 kB, 4-way associative, virtually-indexed and virtually-tagged instruction cache in a 32 kB, 4-way set associative, physically-indexed and physically-tagged data cache. In the particular embodiment, the cache line is 32 bytes wide. This provides the processor with a large, fast, on-chip memory. A bus interface unit within processor 102 couples the memory subsystem to the ZBbus and L2 cache 103 for main memory access and maintains cache coherency along with the ZBbus.

The L2 cache, which is also coupled to the ZBbus, may be a 1 MB on-chip second level cache that may be shared by the four SB-1 processor. The L2 cache may also be shared by the node controller 111, packet manager 112 and any I/O DMA (direct memory access) master. In the particular embodiment, the L2 cache may be organized into a 32 byte cache lines, 8-way set associative. Accesses to the L2 cache may be in full cache blocks. The L2 cache may be a non-inclusive/non-exclusive cache, thus there are no restrictions on which cache blocks may be in the L2. A random replacement policy may be used when a victim line is to be found. The L2 cache may run internally at the CPU core speed and may be fully pipelined. The L2 cache may be physically one of the ZBbus agents, but architecturally the L2 cache sits between the system bus and the main memory and there may be dedicated signals between the L2 and the memory controller 104. In an alternative embodiment, aside for the normal operation of the L2 cache, a mode may exist where banks of the L2 cache may be used as an on-chip SRAM (static random access memory).

The memory controller 104 is a memory controller that works closely with the L2 cache to provide a high-performance memory system. Although the number of channels may vary depending on the memory controller and the system employed, the particular memory controller 104 in the embodiment of FIG. 1 includes four data channels (channels 0-3), in which a given data channel provides a 32-bit data path with 7-bit ECC (error correction code). A variety of memory devices may be controlled by the memory controller 104, including synchronous dynamic random access memory (SDRAM) and double date rate (DDR) SDRAMS. Furthermore, pairs of channels may be ganged together to form up to two 64-bit channels with 8-bit ECC. In one embodiment, the memory controller 104 may directly support up to four standard, two-bank 184-pin DDR DIMMs (double inline memory modules) running at approximately 133 MHz and allows for performance to increase as the DIMMs support higher data rates. The peak memory bandwidth for a ganged 64-bit channel using standard (133 MHz clock) DIMMs may be 34 Gbps and may also increase up to 102 Gbps for a high-speed (400 MHz clock) design using all channels. A given 32-bit channel of memory controller 104 may support up to 512 MB of memory using 256-Mbit technology parts. As larger DRAMS become available the capacity may increase up to and beyond 1 Gb with 512 Mbit parts and beyond 2 GB with 1 Gbit parts for a total of 8 GB across all four channels. Furthermore, special large memory mode may be utilized to increase the size of the memory further when the memory controller 104 is used in conjunction with an external decoder.

The switch 110 may be utilized to switch and route data through either the node controller (NC) 111 or the packet manager (PM) 112. In the particular example system 100 of FIG. 1, three high-speed HT/SPI-4 ports (identified as Port0, Port1 and Port2) coupled to respective HT/SPI4 interfaces 120A-C. The interfaces 120A-C transmit and/or receive HT and/or SPI data using HT and/or SPI-4 protocol. The switch 110 receives data from the interfaces 120A-C and internally segments the received SPI packets and HT transactions for routing to either the NC 111 or PM 112. Similarly, when transmitting data, the switch 110 receives SPI packet data or HT transactions from either the NC 111 or the PM 112 and routes it to one of the interfaces 120A-C. The node controller 111 transfers HT and inter-node coherency traffic between the switch 110 and the ZBbus. The PM 112 transfers packets to and from switch 110 and the ZBbus. Generally, the packets are transferred to and from the PM 112 and the memory controlled by memory controller 104.

Although a variety of circuitry may implement the PM 112, the example embodiment shown in FIG. 1 utilizes a packet manager which may be a direct memory access (DMA) engine that writes packets received from the switch 110 to input queues in the main memory and reads packets from the output queues to the correct interface 120. The particular PM 112 may be comprised of two subsections referred to as input packet manager (PMI) and output packet manager (PMO). Both the PMI and PMO have descriptor engines and caches. These engines may prefetch descriptors and data from main memory as the software releases new descriptors for the PM 112 to work on. The PM 112 may have support for 32 input and 30 output queue descriptor rings. These queues may be assigned to virtual channels of the HT/SPI-4 interfaces 120 under software control. Additionally, the PMO may also handle scheduling packet flows from two or more output queues that may be sent to the same output virtual channel. Additionally, the PM may have TCP (transmission control protocol) and IP (internet protocol) checksum support for both ingress and egress packets.

The NC 110 may perform a number of basic functions. For NC 110 of system 100, the NC 110 may perform functions that include acting as a bridge between the ZBbus and the HT/SPI-4 interfaces 120. Accesses originated on either side may be translated and sent on to the other. Support for HT configuration may also be supported. The second function maybe to implement the distributed shared memory model with a CC-NUMA (cache coherent non-uniform memory access) protocol. Through a remote line directory (RLD), lines may be coherently sent to remote nodes while they are tracked. When lines need to be reclaimed, probes may be issued to retrieve or invalidate them. The node controller 110 may be responsible for generating any coherent commands to other nodes to complete another operation. Ordering of events may also be taken care of in the node controller 110.

The HT/SPI-4 interfaces 120A-C may comprise ports that are configured as interfaces that allow the system to communicate with other chips using either HT and/or SPI-4 (including SPI-4 phase 2) as the link protocol. The interfaces 120A-C are shown having a respective transmitter (Tx) module 130A-C and a receiver module (Rx) 131A-C. In one embodiment there may be two, bidirectional interfaces on the chip, of 16-bits wide and independently capable of acting as an 8/16-bit HT and/or a SPI-4 link. The choice of whether to use a particular interface may be made statically at reset or alternatively by other techniques. The HT protocol may be compliant with version 1.02 of the Hyper-Transport specification. In addition, support may be present or added for the efficient transport of channelized packet data. Packet data herein being referred to the SPI-4 like traffic, which is based on message passing rather than read/write commands. This may be achieved by encapsulating the message packets into HT write commands to special addresses.

The bridge (BR1) 115 interfaces the ZBbus to system interfaces, including a generic bus. Some examples of interfaces to the BR1 are noted in FIG. 1. In one embodiment for system 100, BR1 includes an interface to a generic bus which may be used to attach the boot ROM (read only memory) in a variety of simple peripherals. An SM bus interface may be employed to provide two serial configuration interfaces. The interfaces may provide hardware assistance for simple read and write of slave devices with the system as the bus master. The interface may include one or more DUARTs (dual asynchronous receiver/transmitter) which are serial ports that may provide full-duplex interfaces to a variety of serial devices. A general purpose input/output (GPIO) interface may have a number of pins that are available for general use as inputs, outputs or interrupt inputs. A PCI (peripheral component interconnect) interface may also be present to provide PCI interface to various peripherals and components.

The system controller and debug unit 119 may provide system level control, status and debugging features for the system 100. These functions may include: rest functions, including a full reset activity by an external reset pin; debug and monitoring functions including system performance counters, a ZBbus watcher of data transfers for I/O and memory controller or L2 cache ECC errors, a programmable trace cache which may conditionally trace Z bus events and an address trap mechanism; communication and synchronous functions including gathering and distributing interrupts from the HT, PCI, DMA, and external I/O devices to the SB-1 processors; and timing functions for watch dog timeouts and general purpose timing. The SCD unit 119 may also include Ethernet interfaces (including gigabit Ethernet interface), JTAG (joint test action group) interface and a data mover using a multi-channel DMA engine to offload data movement and limited CRC (cyclic redundancy check) functions from the processors.

It is to be noted that only three HT/SPI-4 interfaces or ports 120A-C are shown in system 100 of FIG. 1. However, the actual number of such ports may vary depending on the system employed. The interface 120 may be a high-speed port for the system and may be configured as either a 16-bit HT or a SPI-4 (including SPI-4 phase 2) interface. A variety of techniques may be employed to allow interface 120 to be a port for HT and SPI-4 data transfer. When in the HT mode, interface 120 may serve as either host or targets of an HT chain. In this configuration, transmitter (Tx) 130 and receiver (Rx) 131 units for a particular interface 120 may be paired together to form a bidirectional HT link. The HT interface may be 1.2 Gbps/wire which results in a bandwidth of approximately 9.2 Gbps per HT link. For SPI-4 mode, the Tx and Rx units 130A-C, 131A-C may be considered independent.

The interfaces 120A-C may be minimally clocked at a frequency to support 10 Gbps packet transfer rate (for example 600-800 Mbps/bit depending upon burst size and the desired link rate). Because the SPI-4 interface may be independent, they can be oriented in an unidirectional flow. Note that in this configuration the ports may still be considered independent with several packet streams and flow control per interface. Lastly, the interfaces 120 may be programmed such that one or more operate as SPI-4 and others in the HT mode. Thus, it is to be noted that the interfaces 120 may be configured in a variety of modes and functions depending on the particular technique of data transfer desired.

Figure 2:
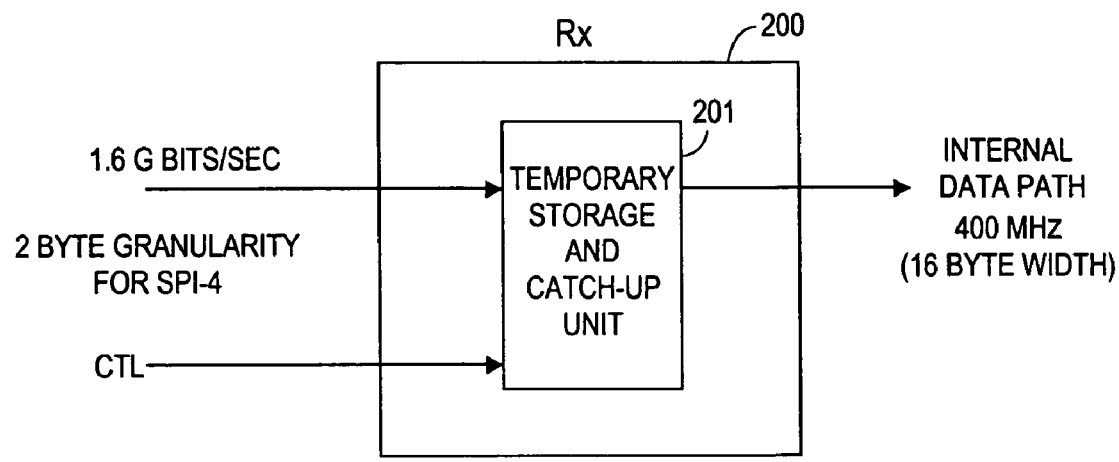
FIG. 2 is a block schematic diagram showing a receiver operably coupled to receive a higher data rate transfer and perform data handling for a slower internal data path.

Referring to FIG. 2, a receiver 200 is shown that incorporates a temporary storage and catch-up unit 201. In the particular examples shown, receiver (Rx) 200 receives data at a rate of 1.6 G bits/sec. Rx 200 may be implemented as Rx 131 of FIG. 1. The data inflow may take a variety of forms and generally follows a particular communication protocol, such as SPI-4 or HT. The form of the data received varies depending on the protocol and may be packets, (such as for SPI-4) or chunks of data (such as for HT). Generally, the SPI-4 standard allows for interleaving of command words and data words in the packet so that the deciphering of the packets may be complex as compared to some other protocols, such as HT which has a more structured requirement placed on the form of the data being received. Furthermore, the incoming data may have different granularity depending on the protocol. For example, with SPI-4 the granularity may be as small as 2-bytes, whereas for HT the granularity of the incoming data may be in 4-byte chunks. Typically, a control signal may also be coupled to the receiver 200 and in one embodiment, the state of the control signal determines if the bytes being received is a control word or a data word. Again, the protocol employed, and the data rate of the incoming data may vary in other embodiments.

In the particular embodiment shown in FIG. 2, the internal data path is set at 400 MHz while the incoming data may be as high as 1.6 G bits/sec. In order to maintain approximately the same bandwidth, the internal data path may be made wider than the width of the incoming data. For the example shown in FIG. 2, the wire width is 2 bytes for SPI-4 and 4 bytes for HT. A frequency scaling factor per channel may be 4, since the data rate scaling is 4:1 (1.6 G bits/sec to 400 MHz). Since the worst case frequency scaling is 4-to-1 in the above example, the width of the internal data path may be made at least 4 times as wide as the width of the incoming data. Accordingly, the frequency scaling of 4-to-1 is performed by the receiver 200 by at least a four-fold increase in the data width. In FIG. 2, an 8-fold increase is shown and may be utilized to also accommodate for a fragmentation factor, which is described below. Thus, the temporary storage and catch-up unit 201 manages the transition of data onto the internal data path.

In the described example, the internal data path is made 16-bytes wide. One way to achieve received data transition onto the internal data path is to utilize a reassembly buffer, such as a reassembly buffer 300 shown in FIG. 3. The reassembly buffer 300 may utilize one or more of a variety of memory devices to perform a buffering function for the incoming data. The size of the reassembly buffer 300 may be determined by a number of factors, including factors associated with the frequency scaling and fragmentation of the data for the internal data path.

Figure 3:
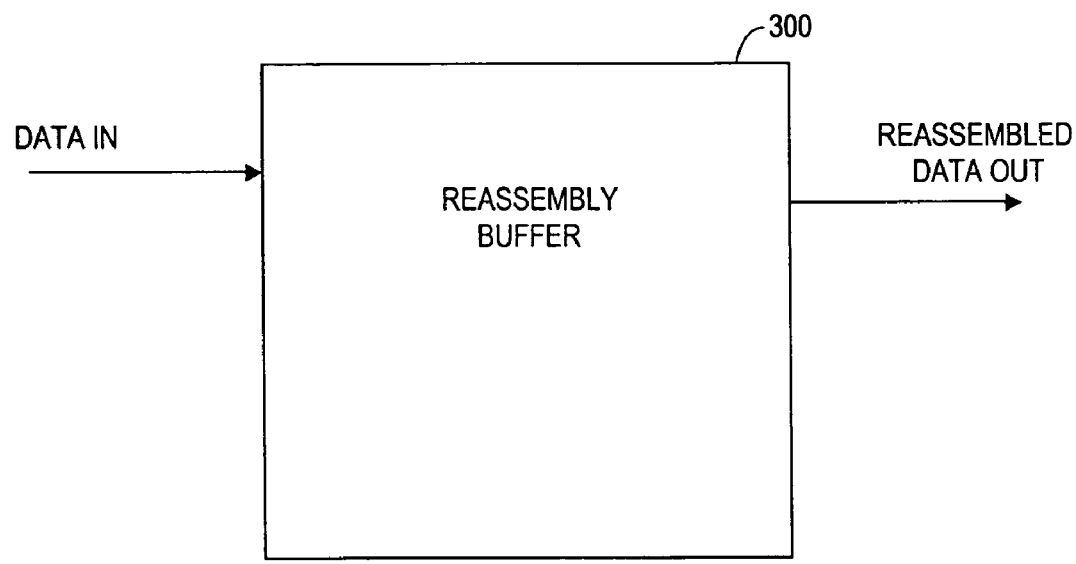
FIG. 3 is a block schematic diagram showing a reassembly buffer in which the size of the buffer is determined by a number of factors, including factors associated with the frequency scaling of data to the slower internal data path.

In the illustration of FIG. 3, the size depth of the buffer 300 may take into account such factors as wire width, number of channels, frequency scaling to the internal data rate, fragmentation of data for alignment, as well as other factors. When SPI-4 protocol is used, the protocol has a 2-byte granularity at the input. Since the frequency scaling factor is 4, it would appear that an internal data path of 8-byte width would be adequate to ensure smooth data transfer. However, since SPI-4 is a type of protocol which allows interleaving of control words and data words, a substantial amount of deciphering may be needed in order to align the data packets for output onto the internal data path. This added time slows down the data handling and is noted as the fragmentation factor. If the fragmentation factor is determined to be around 2, then the combined frequency scaling/fragmentation factors may have a combined value of at least 8. For SPI-4 where the width granularity of the data is two bytes, the total width of the buffer 300 may need to be of sufficient size to maintain the bandwidth for the internal data path. In the example embodiments, 16-byte width is used.

Thus, to maintain proper bandwidth for the incoming data, 16 bytes may need to be output at a slower rate to handle the incoming data adequately, without overflowing the reassembly buffer 300. Generally, the width of the buffer 300 corresponds to the width of the internal data path, which is 16 bytes in this example embodiment for SPI-4. The width of the buffer may be determined by factors such as incoming data width, frequency scaling factor and/or fragmentation factor. Accordingly, as noted in FIG. 2, the internal data path having a clock rate of 400 MHz is set to a 16-byte width for handling SPI-4 data input at 1.6 G bits/second. Again, it is to be noted that embodiments employing other protocols and different internal rates may have other internal width.

In order to process 16-bytes of data for output onto the internal data path for a given clock cycle may require non-standard memory structures or devices. For example, to handle granularity of data (byte length) that is smaller than the internal data path, memories may require the use of two or more write ports. That is, memories having a single read port and multiple write port structure may not be able to perform writes of less than the width of the internal data path. Multiple write port memories may be used, however, such complex memory structures may introduce additional problems. It is to be noted that most standard memory devices are one read port and one write port devices, so that the selection of a particular memory device for the reassembly buffer 300 may be limited, if multiple write port memory structures are to be employed. Accordingly, in order to maintain a single read and single write memory structure, reassembly buffer 300 may need to employ a technique where a single write port memory device(s) may be utilized to perform writes to memory which are less than the width of the internal data path.

Figure 4:
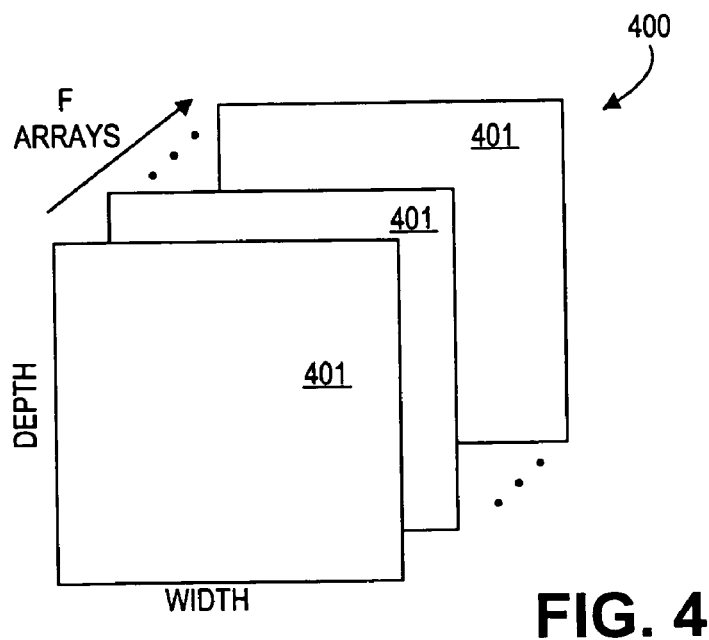
FIG. 4 shows a block schematic diagram of one embodiment of the invention in which a number of arrays are employed to implement the reassembly buffer of FIG. 3.

In order to solve the problem of storing all received fragments of data (where the fragments may have a granularity less than the width of the internal data path), while still utilizing memory devices having single write ports to store the data, the reassembly buffer 300 of FIG. 3 is arranged into a functional array, in which the number of arrays may vary depending on the amount of frequency scaling and fragmentation encountered. Accordingly, as shown in FIG. 4, reassembly buffer 400 is comprised of a memory arrangement having multiple number of arrays. The array is formed by a number of individual array elements 401, typically organized as a matrix (depth x width) of memory cells. Typically, the width of the array corresponds to the width of the internal data path. The depth may be limited by the size of the memory selected. As will be noted below, smaller size memories having single read and single write ports may now be used for the reassembly buffer, since memories may be organized into arrays It is to be noted that the frequency scaling and fragmentation factors may vary from system to system. It may also vary depending on the protocol. For the example receiver 200 illustrated in FIG. 2, the width of the memory array element 401 is determined to be 8-bytes wide, since the width of the incoming data has a granularity of 2 bytes and a frequency scaling of 4. In that example, the 2-byte input granularity for SPI-4 protocol is expanded to 8-bytes, due to the frequency scaling of 4:1. The internal data path is made larger, due to an additional fragmentation factor of the system. In the example, the fragmentation factor is set at 2 to adequately compensate for the worst case fragmentation encountered. If the reassembly buffer is implemented in the array arrangement of FIG. 4, there may be two array elements 401 to handle the frequency scaling/fragmentation of data. Whatever the value may be to maintain the desired bandwidth, the reassembly may have appropriate number of array elements 401 in the reassembly buffer. In this manner, a system worst case frequency scaling/fragmentation condition may be readily addressed by employing appropriate number of memory arrays, while keeping the width of the array element 401 fixed. Since the width may be controlled, the arrangement of the memory elements 401 into an array allows memory devices having single write ports to be used for the reassembly buffer 400.

Figure 5:
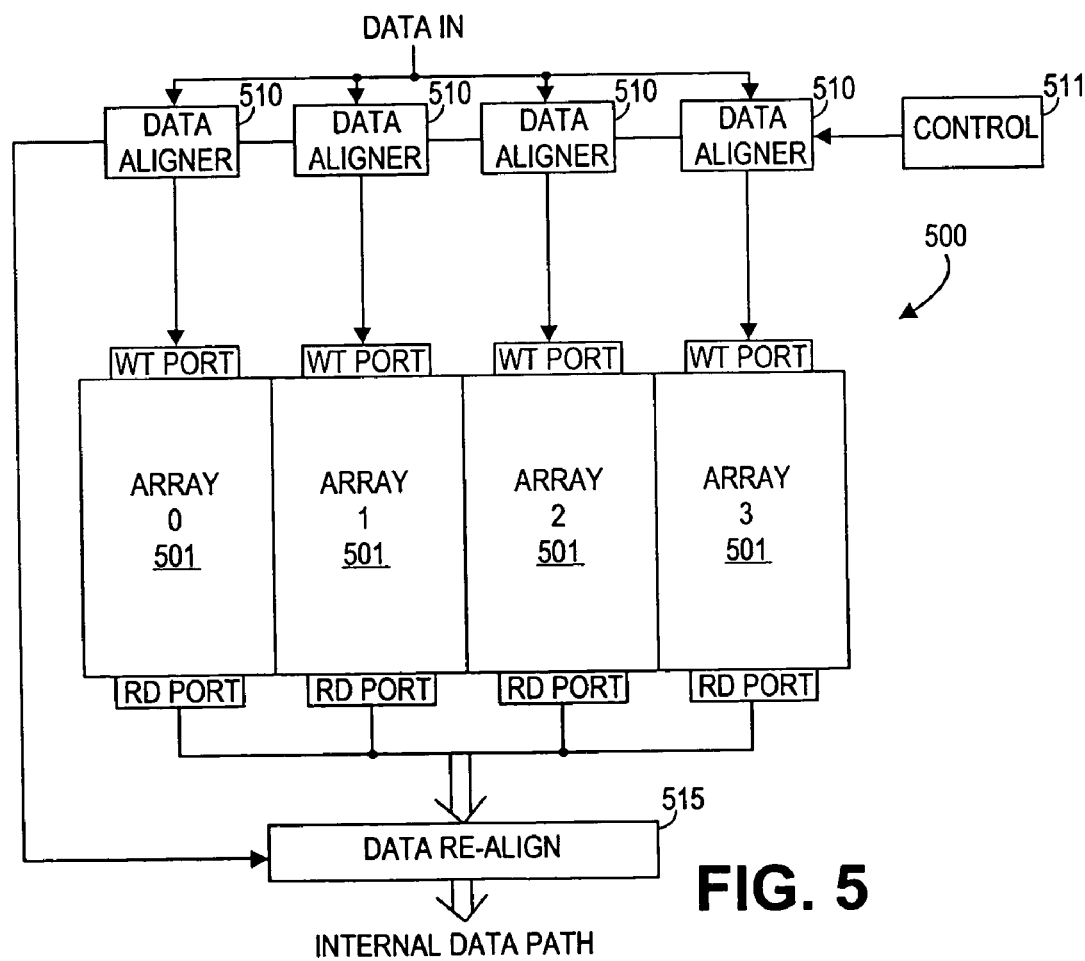
FIG. 5 shows a block schematic diagram of a four array reassembly buffer mechanism in which four data aligners are implemented to align the incoming data into the arrayed reassembly buffer.

FIG. 5 shows another condition where there are four array elements. In this embodiment, four arrays 501 noted as arrays 0, 1, 2, 3 may be employed with individual array elements 501 having a particular depth and width. Again, arrays 501 may comprise memory devices having a single write port and a single read port. In the particular example embodiment shown in FIG. 5, the reassembly buffer 500 operates with a number of data aligners 510. Typically, the number of data aligners 510 present corresponds to the number of arrays 501 that are present, so that a particular data aligner 510 writes data to a corresponding array. However, in other embodiments, the corresponding number of data aligners 510 and arrays 501 may not necessarily match. Also, in other embodiments, a given data aligner may not be dedicated to a corresponding array and may write into other arrays. The data aligners 510 are controlled by a control unit 511 to align the data in proper order for input into the various respective arrays 501.

With certain protocols, such as SPI-4, there may be interleaving of data with control words so that data packets may not be contiguous at the input. Furthermore, with some protocols, such as SPI-4, the size of the data packets may vary, the data packets may be interleaved and packets may not be processed during the same internal clock cycle. Accordingly, data aligners 510, under control of control unit 511, align the incoming data to be placed into one or more arrays 501. This may require the aligners to handle fragments of data, which may be smaller in size than the segment received into the aligners. In one example embodiment, with proper alignment, the data of the same packet are placed in the same entry of one or more of the arrays 501. If the data are from different packets, then the data may be placed into different corresponding entries of the arrays 501.

In one embodiment, the start point of an entry may start in any of the arrays 0-3, since a data packet may commence at any point. For example, with SPI-4 protocol, if EOP (end of packet) resides in array 0 after filling in the packet entries, then the next entry corresponding to the data from the next packet may start in array 1. In that event, data aligners 510 will start the next entry in array 1. That information is passed from the data aligners 510 to a data re-aligner 515 so that when that entry is output from the reassembly buffer 500, the data is realigned to the start of the entry for output onto the internal data path. In this manner, a data entry may start in any one of the arrays but the data is adjusted and re-aligned to have the correct orientation when output onto the internal data path.

Figure 6:
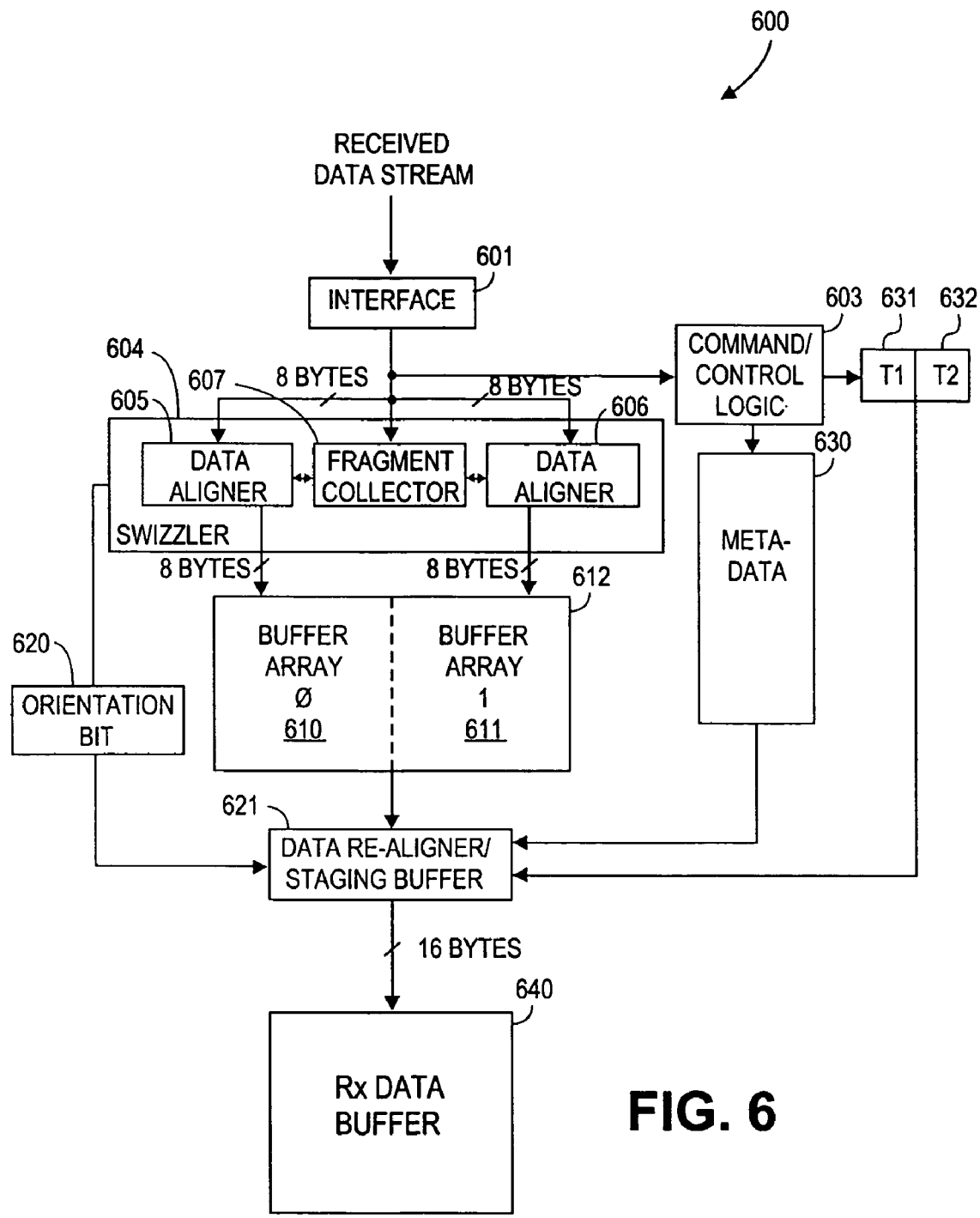
FIG. 6 is a more detailed block schematic diagram showing an embodiment of the invention to process SPI-4 and HT data in which the data is aligned and written into a buffer array that utilizes single read and write ports.

Referring to FIG. 6, an embodiment of the present invention to implement a reassembly buffer comprised of buffer arrays having a single read port and a single write port is shown in circuit 600 of FIG. 6. Circuit 600 may be implemented as one embodiment for the receiver 200 shown in FIG. 2. In this particular instance, the received data stream may be based on a variety of protocols, including SPI-4 or HT protocol. If the receiver 200 of FIG. 2 is implemented, then the data stream input may be at 1.6 G bits/sec rate, in which a 2-byte granularity is present for SPI-4 based data and 4-byte granularity for HT based data. The incoming SPI-4 packets and HT data are received through an interface 601 which performs the frequency scaling based on the internal clock frequency. In the example embodiment of circuit 600, the interface 601 converts the incoming data stream to a width based on the frequency scaling factor.

In following the SPI-4 data in circuit 600, the command words of the SPI-4 packet are sent to a command/control logic unit 603, while the data components are sent to a swizzler 604. The swizzler 604 includes two data aligners 605, 606 and a fragment collector 607. In implementing the receiver 200 of FIG. 2, each data aligner 605, 606 receives 8-bytes of data to process 16-bytes of data between the two data aligners 605, 606. The 8-bytes and 16-bytes correspond to the frequency scaling and fragmentation factors earlier described. In the particular embodiment of circuit 600 of FIG. 6, the 2-byte SPI-4 data granularity is used, while the frequency scaling factor may be a factor of 4. In order to compensate for the fragmentation of the data packet for data alignment, fragmentation factor of two is used in this instance. Two buffer arrays 610 and 611 are implemented as reassembly buffer 612 for reassembly of data to account for the frequency scaling factor and/or the fragmentation factor. As noted, the fragmentation factor takes into account factors such as the, operation of the command/control logic 603 to process command words associated with the fragmentation and alignment of received data.

Thus, assuming that the frequency scaling/fragmentation factors may require the use of certain number of memory cells to implement a buffer having a certain data width, but in which fragments of data may need to be addressed (since the granularity of the fragment is less than the internal data path), the circuit 600 of FIG. 6 allows for smaller segments to be written using memory devices with single write port and read port. In the example shown two buffer arrays 610, 611 are used. Individual buffer arrays 610, 611 have a width of 8-bytes so that the 8-bytes from the data aligners 605, 606 may be written into respective buffer array 0 or buffer array 1.

Since SPI-4 data packets rely on start-up packet (SOP) and end-of-packet (EOP) identifiers, a particular data packet need not necessarily be aligned to a particular word format. In some instances, the data words may be interleaved with command words. The two data aligners 605, 606 aligns the data portion of the data packet for entry into the reassembly buffer 612. In the instance that there may be a data fragment which may not have fit into the previous 8-byte segment (for example, a 2 byte data fragment of a packet left from the last cycle), a fragment collector 607 is utilized to collect the data fragment and combine it with the subsequent packet segment to provide proper alignment of the data for input as an entry of reassembly buffer 612. The fragment collector 607 may not be necessary in some instances. For example, when byte enables allow individual 2-byte segments to be enabled or not enabled for writing into the buffer 612, a fragment collector 607 may not be needed.

Whether the fragment collector or byte enabling is used, the aligned data from swizzler 604 may then be written into one of the buffer arrays 610, 611. The swizzler 604 selects between one of the two buffer arrays 610, 611 depending on which aligner 606, 606 has the next available aligned data for storage into the memory location and the writing of a particular data may start either in buffer array 0 or buffer array 1. The selected buffer array for the start of the entry is determined by the swizzler and identified by an orientation bit 620, which is passed to a data re-aligner/staging buffer unit 621. When the buffer arrays 610 and 611 output the 16-bytes, the orientation bit 620 determines which 8-byte are to be output as the most significant 8-bytes and which buffer array generates the least significant 8-bytes. In this particular embodiment, since there are only two buffer arrays the orientation bit 620 is comprised of a single bit. However, in other embodiments where there may be more than two buffer arrays, the number of the orientation bits depends on the number of arrays present. Thus, if four arrays are present (as employed in the data array of FIG. 5), then there may be two orientation bits to identify the orientation of the four arrays.

Circuit 600 may also include other circuitry to assist in the processing of the packet command words to ensure that individual packets are grouped correctly out of the reassembly buffer. Accordingly, a meta-data unit 630 may be present to transfer certain control information after the command words are decoded by the command/control logic 603. Furthermore, two tables 631 (noted as T1) and 632 (noted as T2) may be utilized to transfer additional information to the data re-aligner/staging buffer 621. For example, table T1 may include information pertaining to the number of words already received for that given channel. Table T2 for example may include information that pertains to which entry of the bank of arrays 610, 611 is currently storing packet data for that channel. The data re-aligner/staging buffer uses this information to read the stored data from the reassembly buffer 612 so that 16-bytes may be output internally. In one embodiment, the 16-bytes are written to the received data buffer 640.

It is to be noted that when utilizing the SPI-4 protocol the memory entries are either filled in completely with incoming data or if not filled in completely an EOP will be present at the end of the data stream for a given entry. In some other protocols where an entry may not be filled in completely, but where there may not be an EOP present, a counter may be utilized to maintain count of the memory locations that are being filled with data. Again, another approach is to utilize byte enables, so that only certain valid data entries are enabled. Furthermore, where word order may be changed between different buffer arrays, an orientation bit or bits may be utilized in order to pass the word order information to the data re-aligner/staging buffer unit 621.

Alternatively, when processing HT data, HT interface unit 601 receives the data input. Unlike SPI-4, HT data follow a more restrictive format, in that HT data are in 4-byte chunks anywhere between 0 to 64-bytes. That is, HT data will have a data length of 0 to 64-bytes in multiple of 4-bytes. Furthermore, a command word is either 4-bytes or 8-bytes under the HT protocol so that data processing for the incoming data is much less complex than that for SPI-4, since the smallest segmentation is four bytes. Accordingly, the configuration of the circuit 600 of FIG. 6 may also be utilized to process 4-byte or 8-byte chunks through the data aligners 605, 606 for HT data. Since the data is contiguous and not interleaved, fragment collector 607 may not be needed in order to process HT data into the reassembly buffer 612. The command/control logic 603 decodes and processes the HT command words in an equivalent fashion as for the SPI-4 command words to generate the meta-data as well as the T1 and T2 table entries. An orientation bit may still be required in order to identify which buffer array has the beginning of the data entry for a given data chunk. The data re-aligner/staging buffer 621 still generates the 16-byte output from the two buffer arrays 610, 611 in which the order of the output is determined by the orientation bit 620. The output is then output to the internal data path which may include the receiver data buffer 640. Again, it is to be noted that individual buffer arrays 610, 611 have single read and single write ports.

Figure 7:
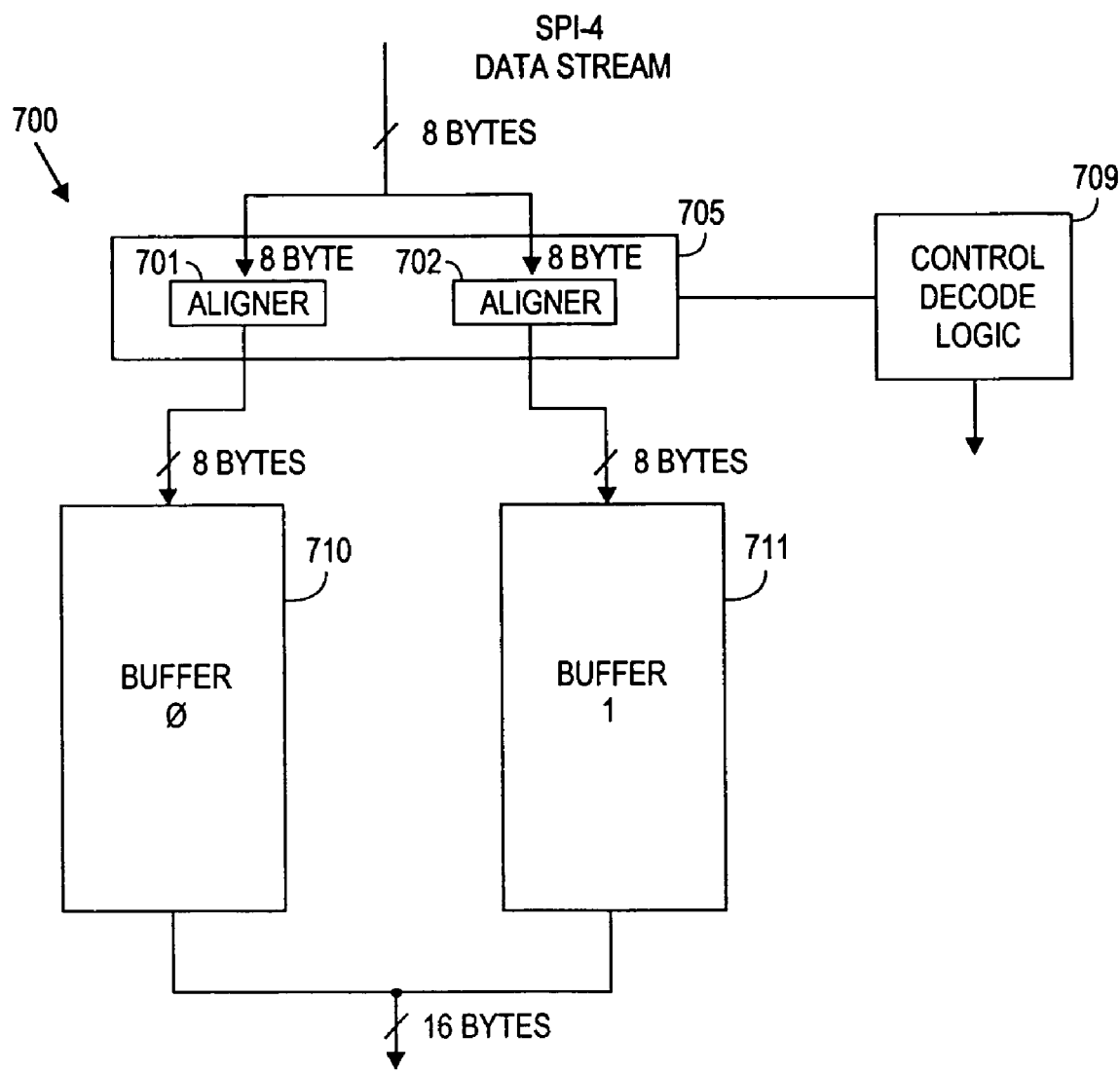
FIG. 7 is a block schematic diagram showing an alternative embodiment of the invention in which a data aligner operates with a reassembly buffer to process SPI-4 data.

Referring to FIG. 7, a circuit 700 is shown. In one embodiment, circuit 700 aligns incoming SPI-4 data for entry into buffers 710, 711. Although circuit 700 may be adapted for other protocols, the description below pertains to the handling of SPI-4 data stream. As noted above, HT alignment has a granularity of 4-bytes so that the separation of two 4-bytes through a 8-byte aligners is of lesser concern. However, with SPI-4, it is a bit trickier since the data granularity is 2-bytes through an 8-byte aligner and 2-byte data fragments may remain. Accordingly, when 8-byte data are input to a swizzler 705, the 8-bytes may be routed to one or the other data aligners 701, 702.

Because SPI-4 granularity is 2-bytes, the 8-byte segment may contain separate information. That is, an 8-byte segment may not comprise contiguous data of a given data packet. In order to ensure that contiguous data from a given packet may be aligned and stored into a buffer 0 or 1 entry, aligners 701, 702 operate on 8-byte segments with consideration for 2-byte fragments. Accordingly, whether a fragment collector or a byte enable technique is used to adjust for the 2-byte misalignment, circuit 700 uses circuit 800, illustrated in FIG. 8, as one embodiment for obtaining the proper alignment of SPI data.

It is to be noted that data aligners 701, 702 may be equivalent to the data aligners 605, 606 shown in FIG. 6. Generally, the aligners 701, 702 may be part of a swizzler 705 which swizzler 705 may operate equivalently to swizzler 604 of FIG. 6. In the embodiment shown in FIG. 7, the two 8-byte outputs are written into two separate buffers 710, 711. Again, buffers 710, 711 may be equivalent to the buffer array 610, 611 of FIG. 6, if a single write port/single read port memories are used. Furthermore, a control decode logic 709 may be utilized to decode control words associated with the SPI-4 packets. Again, the control decode logic 709 may be equivalent to the command/control logic 603 of FIG. 6.

Figure 8:
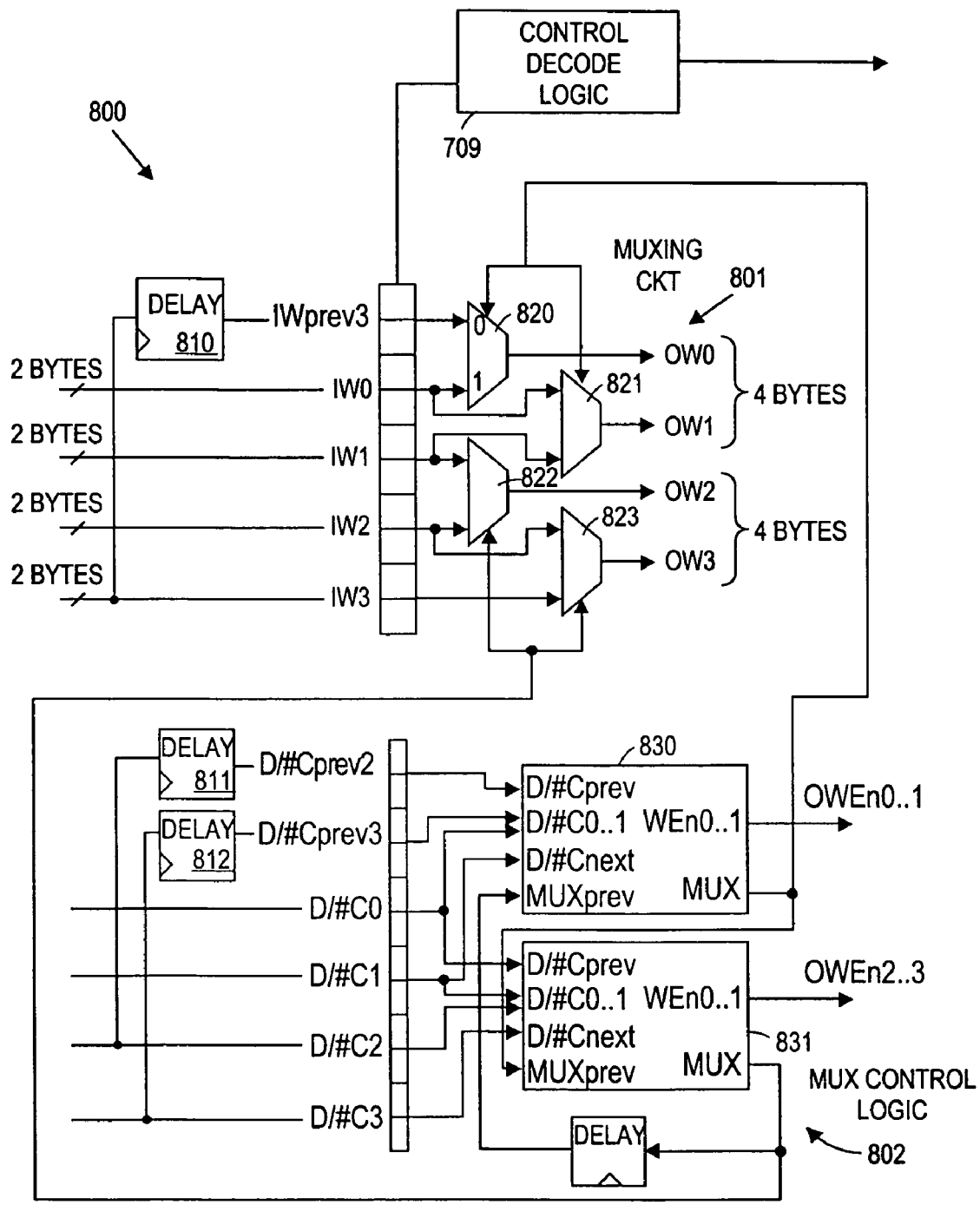
FIG. 8 is a circuit schematic diagram showing the aligner of FIG. 7 in which a multiplexing circuit and a multiplexer control logic is used to properly align the incoming SPI-4 data.

A detailed schematic diagram of the aligner 701 and 702 is shown in FIG. 8. The aligner is comprised of a multiplexing (muxing) circuit 801 and a multiplexer (MUX) control logic 802. Circuit 800 functionally operates equivalent to aligner 701 or 702 of FIG. 7 to output an 8-byte aligned data outputs. Accordingly, muxing circuit 801 corresponds to aligner 701 of 702 of FIG. 7 and the MUX control logic 802 controls the muxing circuit 801.

The input to the muxing circuit 801 are four sets of 2-byte inputs which correspond to the 2-byte granularity input for SPI-4 data stream. Accordingly, IW0, IW1, IW2 and IW3 correspond to $1^{st}$, $2^{nd}$, $3^{rd}$ and $4^{th}$ 2-byte data chunks received as input data. The input IWprev3 is the previous IW3 input. A delay 810, which may be implemented as a flip-flop, may be used to generate the IWprev3 signal that has one clock delay from the previous IW3 input. Thus, IWprev3 input corresponds to the IW3 signal from the previous clock phase or the double-byte preceding IW0. Each double-byte forming the IW0-IW3 inputs, as well as IWprev3, is referred to as a double-byte word.

The input to the MUX control logic 802 are control signals identified as D/#C0, D/#C1, D/#C2 and D/#C3. These signals correspond to a control signal which identifies if IW0-IW3 are data or control double-bytes, respectively. A 0 is used to designate a control double-byte while 1 is used to identify that the double-byte is data. Thus, if D/#C0 has a value of 1 then IW0 is data. Similarly, if D/#C0 has a value of 0 then IW0 is a control signal. D/#C1, D/#C2 and D/#C3 similarly correspond to identify if IW1, IW2, IW3 respectively are control or data double-byte words. As shown in FIG. 8, control double-byte words are sent to the control decode logic 709 and only data are passed through the muxing circuit 801.

Furthermore, the MUX control logic 802 also generates two other inputs to the state machines. These two other input signals are delayed inputs from the last D/#C2 and D/#C3 signals. Therefore, D/#Cprev2 is the previous D/#C2 control signal and D/#Cprev3 signal is the previous D/#C3 control signal. Again, delay units such as delay units 811 and 812, which may also be flip-flops, are utilized to introduce the previous D/#C2 and D/#C3 signals as additional inputs to the MUX control logic 802.

How the circuit 800 operates may be better understood in reference to a truth table 900 shown in FIG. 9. The truth table 900 only shows the operation of one of the state machines 830 or 831 for one set of two double-byte inputs. However, the operation of the other state machine follows the same truth table. The truth table 900 shows the various states based on inputs to the state machine, which control the operation of MUXs 820/821 or 822/823. Thus, in reference to one of the state machines and the operation of its corresponding pair of multiplexers, table 900 identifies possible states for input terminal D/#C0..1. In this column a value of 1 identifies that the particular double-byte is data, while a value of 0 identifies that the particular double-byte is a control word. D/#Cprev input pertains to a control/data identifier signal for a double-byte occurring previous to the D/#C0..1 entries. D/#Cnext input pertains to a control/data identifier signal for a double-byte following the D/#C0..1 entries.

For the state machine 830, the input signals are control/data identifiers D/#Cprev2, D/#Cprev3, D/#C0 and D/#C1. For the state machine 831, the input signals are control/data identifiers D/#C0, D/#C1, D/#C2 and D/#C3. The MUXprev input for state machine 831 is obtained from the MUX output of state machine 830. The MUXprev input of state machine 830 is obtained from a one clock delayed MUX output of state machine 831. Accordingly, table 900 shows possible inputs to either state machine 830 or 831. The outputs from each of the state machines 830, 831 are noted as MUX outputs and OWEn0..1. The IW column shows the state of the data word based on the input given. The POS cnter column shows the position of the double-byte in the packet after a control word. Essentially, POS cnter is a counter counting positions following a control word (noted as C). What the state machine attempts to do is to identify which double-bytes are data and are aligned correctly or if realignment by a double-byte may be needed.

The state machine 830 controls the operation of MUXs 820 and 821 to select either IWprev3 double-byte along with IW0 as the 4-byte output from OW0 and OW1 or selects IW0 and IW1 as outputs OW0 and OW1. That is, either the previous IW3 (IWprev3) was left as a fragment to be combined with IW0 or IW0 and IW1 are aligned. State machine 831 selects between the output of IW1, IW2 or alternatively the outputs IW2, IW3, as the 4-byte output from OW2, OW3.

In table 900, the column under IW shows the states of the input to the muxing circuit 801. For the entries under the column IW, the first designation refers to the D/#Cprev input, the two entries following the hyphen pertain to D/#C0..1 pair of inputs, and the entry following the second hyphen pertains to the D/#Cnext input. The bold entries identify the proper alignment of the data where the even double-byte is always the first entry of the two double-byte pair. The odd double-byte (referenced as 1), following the even double-byte (referenced as 0), may be data or it may be a control word.

Accordingly, the entry across the first row signifies that the current two double-bytes are both data but that the previous double-byte was a control word. In that instance, since the previous double-byte was a control word, the current two data words are properly aligned as noted by the bold designation of 01 under column IW. The position counter is set to 0 since it follows a control word and the MUX output is 0 indicating that the current two entries are to be selected. The Wen0..1 output of 11 signifies that both outputs are to be enabled since both represent a data packet. In this entry, since both current double-bytes are output as data and enabled. The fourth data entry is disregarded (shown as x) for this cycle, since both current double bytes are to be output.

The second row entry identifies a condition when both double-byte entries are data, as well as the previous double-byte entry. The position counter continues to count since no control word is noted for the current pair of double-bytes or the previous double-byte. Both current double-byte pairs are enabled, since the MUX output value is 0 and since Wen01 has a value 11 to enable the writing of both current double-bytes into the reassembly buffer. Again, it is to be noted that proper alignment is obtained since the first entry of the current double-byte pair is aligned to the even double-byte boundary.

However, in the third row entry, the alignment is off since the first double-byte of the current set of two double-byte words is an odd double-byte (as noted by the value 1). In this instance, the MUX value is set to 1 so that the output is aligned to the second double-byte of the current data. Accordingly, since D/#Cnext has a value of 1 in the third row, this signifies that the subsequent double-byte entry is data, as shown by the odd double-byte value 1 under the column IW at the third row. Thus, the alignment boundary combines the previous double-byte (even double-byte) and the first double-byte of the current double-byte pair (odd-double-byte). The second double-byte of the current pair (even double-byte) is left as a fragment and combined with the next double-byte.

In the fourth row entry the D/#Cnext signifies control, indicating that the next double-byte is a control word (as noted a C under the column IW for the fourth row entry) and Wen0..1 output only enables the first double-byte, since only the first double-byte is data. The remaining rows pertain to the other states of the state machine wherein the MUX output values flip between 0 and 1 to determine if IWprev3-IW0-IW1-IW2 will be output as the 8-bytes from the data aligner or if IW0-IW1-IW2-IW3 will be output. The alignment places the even double-byte as the most significant byte of the 4-byte boundary. The output enable signal determines which bytes are enabled and written into the buffer based on if the double-byte is data or a control. Only data is written into the buffer. Accordingly, with the implementation of the muxing circuit 801 and the MUX control logic 802, which includes the state machines 830 and 831, proper alignment of the even double-byte data may be ensured when data words are written into the buffer units such as buffer 710, 711 of FIG. 7.

It is to be noted that the circuit 800 of FIG. 8 may be employed as the aligner to handle the SPI-4 data for the circuit 600 of FIG. 6. In circuit 600 the buffer arrays are arranged in a single read port and single write port arrangement. However, it is to be noted that circuit 800 may be employed in a buffer structure in which separate buffers may be employed or in buffers which may employ other structures than the array structures shown in FIG. 6. Furthermore, although circuit 800 is designed to operate on SPI-4 data, the circuit may be readily adapted for use with other protocols as well.

Thus, a scheme to handle the receiving of data at a much higher data rate for use by a slower clocked device is described. In one embodiment the scheme allows storing of received data in a single write port and single read port memory device, allowing for more standard memory components to be used with less complexity. In another embodiment, a particular byte fragment handling scheme is used for SPI-4 packets.

We claim:

1. An apparatus comprising:
   a data aligner to receive a data stream from a data transmission link and to separate the received data stream into a segment of predefined number of bytes to identify data bytes for alignment, wherein the data has a granularity of less than a width of an internal data path, the data aligner to align a fragment of data with a current segment or delay the fragment to combine with a next segment for alignment into interim storage for subsequent output onto the internal data path; and
   a buffer to receive aligned data from the data aligner for interim storage and to output data onto the internal data path.

2. The apparatus of claim 1 further including a control decode logic to separate commands from data at an input to the data aligner and to process commands to align the data.

3. The apparatus of claim 2, wherein the data aligner includes a multiplexing circuit to multiplex certain minimum contiguous bytes of data for the alignment into the interim storage, the multiplexing circuit selecting from current and delayed fragments to obtain alignment of data.

4. The apparatus of claim 3, wherein the data aligner includes a multiplexer control logic to control the multiplexing circuit.

5. The apparatus of claim 4, wherein the multiplexer control logic includes at least one state machine to generate a select signal to the multiplexing circuit to control fragment byte selection for alignment.

6. The apparatus of claim 5, wherein the at least one state machine enables bytes output from the multiplexing circuit when the output bytes are data bytes.

7. The apparatus of claim 6, wherein the data aligner to receive data is based on the SPI-4 protocol.

8. An apparatus comprising:
   a data aligner to receive a data stream from a data transmission link and to separate the received data stream into a segment of eight bytes to identify data bytes for alignment, wherein the data has a granularity set to two bytes (double-byte) and in which the aligner to align a double-byte fragment of data with a current segment or delay the fragment to combine with a next segment for alignment into interim storage for subsequent output onto an internal data path; and
   a buffer to receive aligned data from the data aligner for interim storage and to output data onto the internal data path.

9. The apparatus of claim 8 further including a control decode logic to separate commands from data at an input to the data aligner and to process commands to align the data.

10. The apparatus of claim 9, wherein the data aligner includes a multiplexing circuit to multiplex two pairs of double-byte words, but in which alignment of the pairs of double-byte words places even numbered double-byte data word at a beginning of the eight-byte segment to alignment the data.

11. The apparatus of claim 10, wherein the data aligner includes a multiplexer control logic to control the multiplexing circuit, wherein the multiplexer control logic includes at least one state machine to generate a select signal to the multiplexing circuit to control double-byte fragment selection for output from the multiplexing circuit to obtain alignment of data.

12. The apparatus of claim 11, wherein the at least one state machine enables certain double-byte output from the multiplexing circuit when the certain double-byte output is a double-byte data word.

13. The apparatus of claim 12, wherein the data aligner to receive data is based on the SPI-4 protocol.

14. An integrated circuit comprising:
   an interface unit to receive incoming data stream from a data transmission link for use by the integrated circuit;
   a control decode logic operably coupled to the interface unit to receive and separate commands from the incoming data stream for use to align data;
   a data aligner to receive data from the interface unit and to segment the received data into a segment of eight bytes to identify data bytes for alignment, wherein the data has a granularity set to two bytes (double-byte) and in which the data aligner to align a double-byte fragment of data with a current segment or delay the fragment to combine with a next segment for alignment into interim storage for subsequent output onto an internal data path; and a buffer to receive aligned data from the data aligner for interim storage and to output data onto the internal data path.

15. The integrated circuit of claim 14, wherein the data aligner includes a multiplexing circuit to multiplex two pairs of double-byte words, but in which alignment of the pairs of double-byte words places even numbered double-byte data word at a beginning of the eight-byte segment to obtain alignment of data.

16. The integrated circuit of claim 15, wherein the data aligner includes a multiplexer control logic to control the multiplexing circuit, wherein the multiplexer control logic includes at least one state machine to generate a select signal to the multiplexing circuit to control double-byte fragment selection for output from the multiplexing circuit to obtain alignment of data.

17. The integrated circuit of claim 16, wherein the at least one state machine enables certain double-byte output from the multiplexing circuit when the certain double-byte output is a double-byte data word.

18. The integrated circuit of claim 17, wherein the data aligner to receive data is based on the SPI-4 protocol.

19. A method comprising:

segmenting a data stream received from a data transmission link by separating the received data stream into a segment of eight bytes to identify data bytes for alignment, wherein the data has a granularity set to two bytes (double-byte);

aligning the eight bytes so that a double-byte fragment is aligned with the current segment or delayed to combine with a next segment for alignment into interim storage for subsequent output onto an internal data path;

multiplexing two pairs of double-byte word groups for output, but in which alignment of the pairs of double-byte words places even numbered double-byte data word at a beginning of the eight-byte segment to obtain alignment of data; and buffering aligned data into interim storage to output data onto the internal data path.

20. The method of claim 19, wherein the segmenting the data stream segments data based on SPI-4 protocol.

* * * * *